United States Patent [19]

Terayama et al.

[11] Patent Number: 4,955,257
[45] Date of Patent: Sep. 11, 1990

[54] METHOD OF CONTROLLING SHIFTS IN AN AUTOMATIC TRANSMISSION

[75] Inventors: Satoshi Terayama, Tokyo; Takashi Aoki; Shigeo Ozawa, both of Saitama; Eiji Kitsutaka, Tokyo, all of Japan

[73] Assignee: Honda Giken Kogyo Kabushiki Kaisha, Tokyo, Japan

[21] Appl. No.: 350,015

[22] Filed: May 9, 1989

[30] Foreign Application Priority Data

May 9, 1988 [JP] Japan .................................. 63-112071

[51] Int. Cl.$^5$ ............................................. B60K 41/06
[52] U.S. Cl. ..................................... 74/866; 364/424.1
[58] Field of Search ................. 74/866, 867, 868, 869; 364/424.1

[56] References Cited

U.S. PATENT DOCUMENTS

| | | | |
|---|---|---|---|
| 4,507,736 | 3/1985 | Klatt | 364/424.1 |
| 4,643,048 | 2/1987 | Hattori et al. | 74/866 |
| 4,648,290 | 3/1987 | Dunkley et al. | 74/866 |
| 4,662,247 | 5/1987 | Sotoyama et al. | 74/866 |
| 4,742,733 | 5/1988 | Schreiner | 74/866 |
| 4,753,135 | 6/1988 | Sotoyama et al. | 74/866 |
| 4,838,126 | 6/1989 | Wilfinger et al. | 74/866 |
| 4,852,006 | 7/1989 | Speranza | 74/869 |
| 4,855,913 | 8/1989 | Brekkestran et al. | 74/866 X |
| 4,858,501 | 5/1989 | King | 74/867 X |

FOREIGN PATENT DOCUMENTS 61-189354 8/1986 Japan .

Primary Examiner—Dwight Diehl
Attorney, Agent, or Firm—Lyon & Lyon

[57] ABSTRACT

An automatic transmission shift controlling method for preventing both excessive delays in speed ratio shifts and multiple shifts in close succession in response to two different shift commands in a short time period.

When a first shift command is issued, the input and output rotational speed ratio of a shift device associated with a first target speed range for selecting a power transmission path associated with the first target speed range and determined by the first shift command is detected, and the start of operation of the shift device associated with the first target speed range is detected by checking whether the input and output rotational speed ratio has started to vary or not. When a second gear-shift command is issued after the first shift command has been issued but before the start of operation of the shift device is detected, the second shift command is accepted.

6 Claims, 8 Drawing Sheets

METHOD OF CONTROLLING SHIFTS IN AN AUTOMATIC TRANSMISSION

BACKGROUND OF THE INVENTION

The present invention relates to a vehicular automatic transmission for changing power transmission paths by controlling operation of shift means.

Automatic transmissions are arranged to shift gears automatically dependent on running conditions of a motor vehicle to achieve desired vehicle running characteristics. It is customary to provide a shift map composed of upshifting and downshifting lines for each speed range, the lines being established in relation to the vehicle speed and the engine power output, and to control the automatic transmission to shift the gears according to the shift map dependent on the running conditions as indicated on the shift map. One example of such shifting control is disclosed in Japanese Laid-Open Patent Publication No. 61-189354, for example.

One type of automatic transmission includes a power transmission means comprising a plurality of power transmission paths (e.g., Plurality of gear trains), a plurality of shift means (e.g., a plurality of hydraulically operated clutches) for selecting the power transmission paths, and a control means (e.g., a hydraulic control valve) for controlling operation of the shift means. When a running condition of a motor vehicle, as indicated on a shift map, moves across an upshifting or downshifting line, a shift command is produced to effect an upshift or downshift, and a solenoid valve is operated based on the shift command to control operation of the hydraulic control valve to engage one of the hydraulically operated clutches. The power transmission path through a certain gear train associated with the engaged clutch is now selected to effect a shift.

If the solenoid valve is operated, at the same time as when the shift command is applied, to enable the hydraulic control valve (the control means) to operate the hydraulically operated clutch (shift means), then the shift can be performed without any time lag, but the driver of the motor vehicle may feel that the transmission operates too busily.

More specifically, it is assumed here that downshifts should be effected from 4th to 3rd to 2nd speed ranges by depressing an accelerator pedal. If the accelerator pedal is slowly depressed, then the driver feels that the transmission operates normally when the downshifts are performed in the order described above. However, if the accelerator pedal is quickly depressed to achieve a kickdown, for example, two downshifts are carried out in a short period of time when they are performed in the above sequence, and the driver feels that the operation of the transmission is too busy. The latter shift should preferably be effected by downshifting from the 4th speed range directly into the 2nd speed range while skipping the 3rd speed range.

To meet the above requirement, it has heretofore been customary to provide a decision timer for inhibiting a shift signal (e.g., a signal for operating the solenoid valve) within a preset period of time after a shift command had been issued. When a shift command for a downshift into the 3rd speed range while the motor vehicle is running with the transmission in the 4th speed range, and if a shift command for the 2nd speed range follows within the preset period of time, then the last shift command (a command for the 2nd speed range) is accepted while overriding the previous shift command. Upon elapse of the preset period of time, a shift is effected from the 4th speed range to the 2nd speed range, thus preventing the transmission from effecting successive shifts too quickly.

Figure 8A:
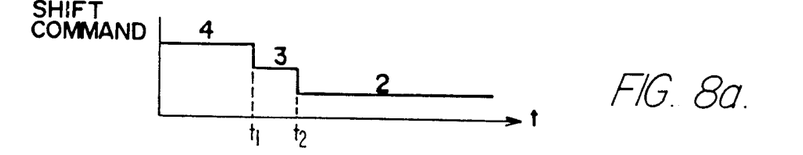
Figure 8B:
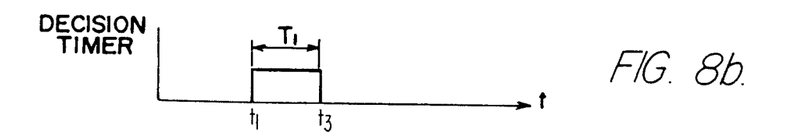
Figure 8C:
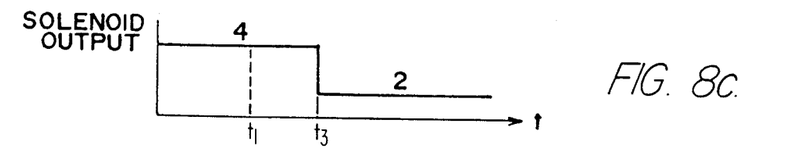
Figure 8D:
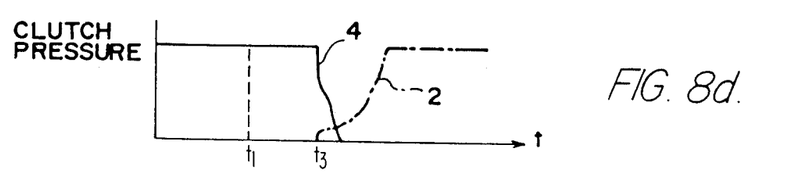
Figure 8E:
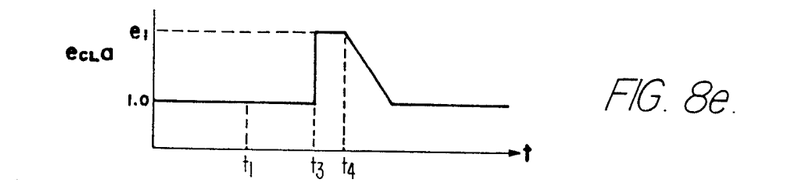

The above shift operation will be described in greater detail with reference to FIG. 8 of the accompanying drawings. In the graph of FIG. 8, while a motor vehicle is running with the transmission in the 4th speed range, a first shift command for the 3rd speed range is issued at a time $t_1$, and then a second shift command for the 2nd speed range is issued at a time $t_2$. At the time $t_1$, a decision timer is operated, and an output from a shift solenoid is inhibited for a period of time $T_1$ from the time $t_1$ to a time $t_3$. Since the second shift command is issued in the period of time $T_1$, a shift output for the 2nd speed range is issued from the shift solenoid at the time $t_3$ when the time period $T_1$ elapses, thus effecting a shift from the 4th speed range to the 2nd speed range. Therefore, the hydraulic pressure in the 4th-sheed-range clutch is quickly lowered, whereas the hydraulic pressure in the 2nd-speed-range clutch is increased, at the time $t_3$. However, since the 2nd-speed-range clutch starts being engaged a certain time lag after the hydraulic pressure in the 2nd-speed-range clutch starts rising at the time $t_3$, the input and output rotational speed ratio $e_{CLa}$ (=the ratio between the rotational speeds of input and output shafts) of a target-speed-range clutch starts to change at a time $t_4$. The rotational speed ratio $e_{CLa}$ remains 1.0 till the time $t_3$ because any shift is inhibited till that time and a target speed-range up to that time is the present speed range (4th speed range in this case).

As described above, use of the decision timer is effective in preventing the transmission from effecting successive shifts too quickly. For reliable prevention of quick successive shifts, the period of time to which the descision timer is set should be of a certain long duration. While the decision timer is operating, however, no shift is carried out even if a shift command is issued, and there is a certain time lag before the target-speed-range clutch starts being actually engaged after the elapse of the present period of time of the decision timer. Consequently, if the present period of time of the decision timer is long, the time lag before the shift is performed tends to be too large.

For example, although the shift is issued at the time $t_1$, the target-speed-range clutch (i.e., the 2nd-speed-range clutch) starts to be actually engaged only when the time time $t_4$ is reached. Accordingly, the interval from the time $t_1$ to the time $t_4$ is present as a time lag, the interval from the time $t_1$ to the time $t_3$ being the preset period of time of the decision timer, and the interval from the time $t_3$ to the time $t_4$ being the period of time before the 2nd-speed-range clutch starts being engaged.

Even if the above time lag is present, the automatic transmission does not give the driver an odd feeling due to the time lag in normal operation because the driver cannot foresee when shifts are made. However, when the driver willfully starts a shift by quickly depressing the accelerator pedal or operating the shift lever or shift switch, if the above time lag is present, then the driver feels a delay in effecting the desired shift, and the driver will have an odd feeling with respect to the shift.

SUMMARY OF THE INVENTION

In view of the aforesaid problems of the conventional automatic transmissions, it is an object of the present invention to provide a method of controlling shifts in an automatic transmission for preventing the transmission from effecting shifts too busily and also suppressing a delay in making shifts.

According to the present invention, when a first shift command is issued, the input and output rotational speed ratio of a shift means associated with a first target sheed range for selecting a power transmission path associated with the first target speed range and determined by the first shift command is detected, and the start of operation of the shift means associated with the first target speed range is detected by checking whether the input and output rotational speed ratio has started to vary or not. When a second shift command is issued after the first shift command had been issued but before the start of operation of the shift means is detected, the second shift command is accepted.

With the above control process, even after the present time of a decision timer, which is started when the first shift command is issued, has elapsed, the second shift command is accepted until the shift means associated with the first target speed range is actually started. If a period of time in which the second shift command is acceptable is longer than a certain duration, then the transmission is prevented from effecting successive shifts too busily. Therefore, even if the present time of the decision timer is made shorter than the conventional preset time of the decision timer, a period of time for accepting the second shift command, which is long enough to prevent the transmission from operating too busily, can be ensured. Consequently, a time lag in effecting shifts is reduced, and shifts are controlled without giving the driver an odd feeling about the operation of the transmission.

Further scope of applicability of the present invention will become apparent from the detailed description given hereinafter. However, it should be understood that the detailed description and specific examples, while indicating a preferred embodiment of the invention, are given by way of illustration only, since various changed and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIGS. 5a-f; 6a-f; and 7a-c are graphs showing how shift commands, shift solenoid outputs, etc., vary with respect to time under shift control for effecting various shifts; and FIGS. 8a-e are a graph showing how a shift command, a shift solenoid output, etc., vary with respect to time according to a conventional control method.

DESCRIPTION OF THE PREFERRED EMBODIMENTS

Figure 1:
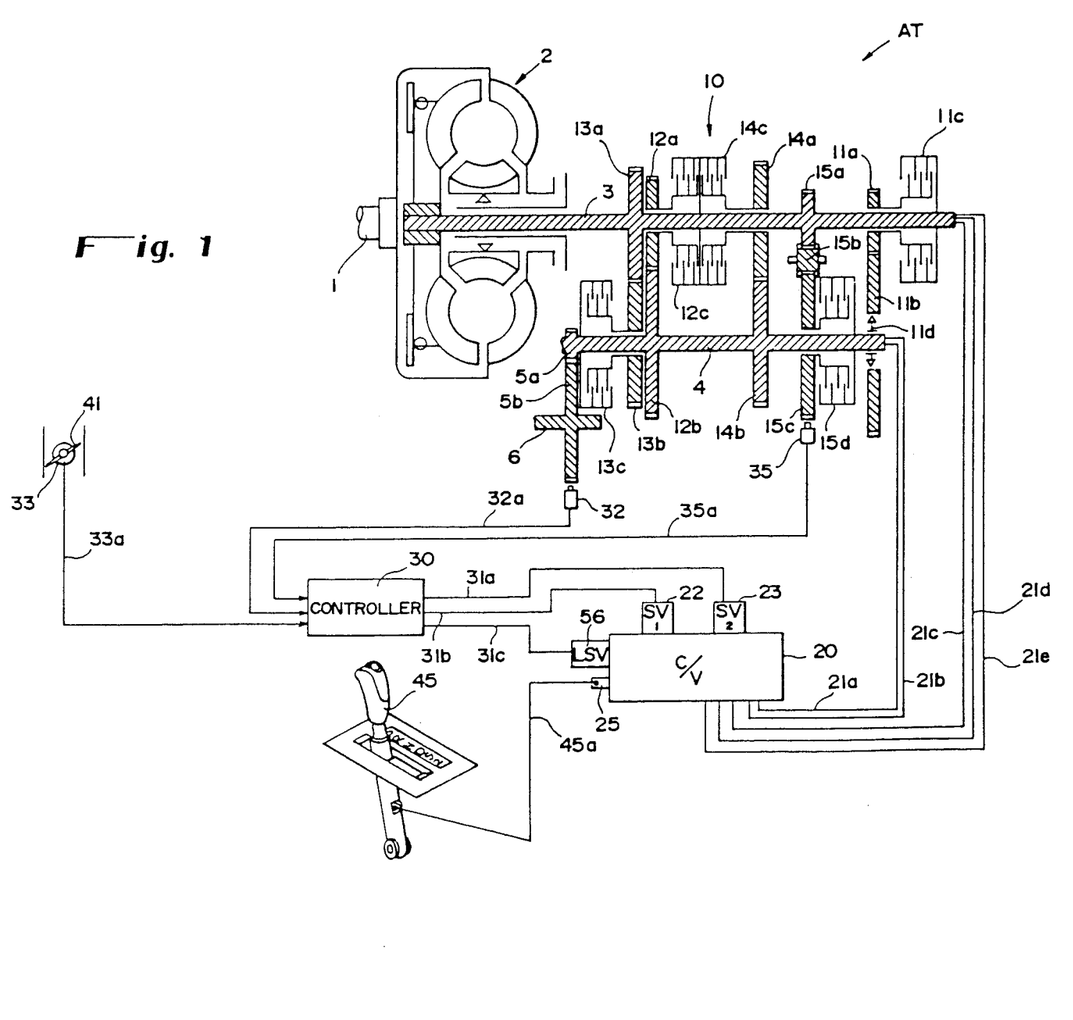
FIG. 1 is a schematic view of an automatic transmission controlled by a shift control method according to the present invention.

FIG. 1 schematically shows an automatic transmission which is mounted on a motor vehicle and controlled by a method of the present invention. The automatic transmission, generally denoted at AT, has a transmission mechanism 10 comprising a plurality of gear trains for changing the speed of rotation of the engine. power output transmitted from an engine output shaft 1 through a torque converter 2 and for applying the engine power output to an output shaft 6. More specifically, the engine power output from the torque converter 2 is applied to a transmission input shaft 3, and then transmitted, while its rotational speed is being changed, to a couuntershaft 4 extending parallel to the input shaft 3 through a selected a selected one of five gear trains disposed parallel between the input shaft 3 and the countershaft 4. The engine power output is then applied from the countershaft 4 to the output shaft 6 through output gears 5a, 5b disposed between the countershaft 4 and the output shaft 6.

The five gear trains between the input shaft and the countershaft 4 include a gear train composed of gears 11a, 11b for a first speed range, a gear train composed of gears 12a, 12b for a second speen range, a gear train composed of gears 13a, 13b for a third speed range, a gear train composed of gears 14a, 14b for a fourth speed range, and a gear train composed of gears 15a, 15b, 15c for a reverse speed range. These gear trains are associated respectively with hydraulically operated clutches 11c, 12c, 13c, 14c, 15d for enabling the gear trains to transmit the engine power output from the input shaft 3 to the countershaft 4. A one-way clutch 11d is disposed in the gear 11b. By selectively operating the hydraulically operated clutches, one of the five gear trains is selected for engine power transmission while changing the rotational speed of the transmitted engine power output.

The five hydraulically operated clutches 11c through 15d are controlled in operation by a hydraulic pressure supplied and discharged through hydraulic pressure lines 21a through 21e from and to a hydraulic pressure control valve assembly 20.

The hydraulic pressure control valve assembly 20 is operated by a manual spool valve 25 coupled by a wire 45a to a shift lever 45 movable by the driver, two solenoid valves 22, 23, and a linear solenoid valve 56.

The solenoid valves 22, 23 are selectively actuated and inactivated by operating signals supplied from a controller 30 through signal lines 31a, 31b. The linear solenoid valve 56 is operated by a signal from the controller 30 via a signal line 31c. The controller 30 is supplied with a rotational speed. signal fed via a signal line 35a from a first rotational speed sensor 35 which detects the rotational speed of an input member of the hydraulically operated clutch 15d based on rotation of the reverse gear 15c, a rotational speed signal fed via a signal line 32a from a second rotational speed sensor 32 which detects the rotational speed of an output member of the hydraulically operated clutch 13c based on rotation of the output gear 5b, and a throttle valve opening signal fed via a signal line 33a from a throttle valve opening sensor 33 which detects the opening of an engine throttle valve 41.

Operation to control shifting in the automatic transmission of the above construction will described below.

Shifting control is performed dependent on a shift range selected by the manual valve 25 of the hydraulic pressure control valve assembly 20 in response to manual operation of the shift lever 45. Available shift ranges include shift ranges or positions P, R, N, D, S, 2 for example. In the ranges P and N, all the clutches 11c through 15d are disengaged and the transmission is in a neutral position. In the range R, the reverse-speed-range clutch 15d is engaged to select the reverse speed range. D, S, and 2 speed ranges are selected based on a shift map.

Figure 2:
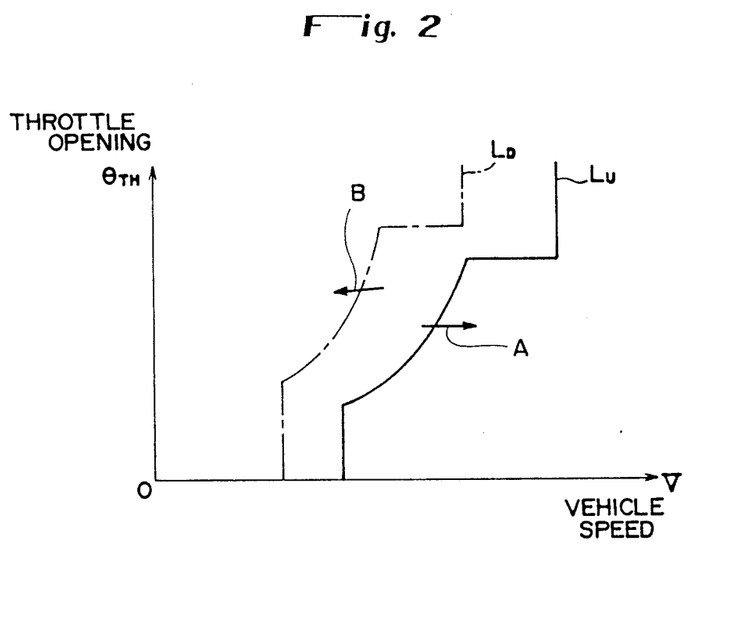
FIG. 2 is a graph illustrating a shift map used for shift control.

As shown in FIG. 2, the shift map is composed of an upshifting line $L_U$ and a downshifting line $L_D$, these lines being plotted in a graph having a vertical axis indicating the throttle valve opening $\theta_{TH}$ and a horizontal axis indicating the vehicle speed V. When a point on the shift map which represents the running condition of the motor vehicle as determined by the engine throttle valve opening (the amount of depression of the accelerator pedal) and the vehicle speed moves to the right across the upshifting line $L_U$, the transmission effects a gear upshift. When the point moves to the left across the downshifting line $L_D$ after the upshift, the transmission effects a gear downshift. While the shift map of FIG. 2 is shown as having one upshifting line and one downshifting line, the shift map actually has a plurality of upshifting lines and a plurality of downshafting lines dependent on the number of speed ranges available in the transmission.

When the running condition point in the shift map goes across the upshifting or downshifting line, the controller 30 applies operating signals over the signal lines 31a, 31b, to the solenoid valves 22, 23 to operate the hydraulic control valve assembly 20 to supply hydraulic pressure to and discharge hydraulic pressure from the hydraulically operated clutches 11c through 11d for effecting an upshift or a downshift.

Figure 3:
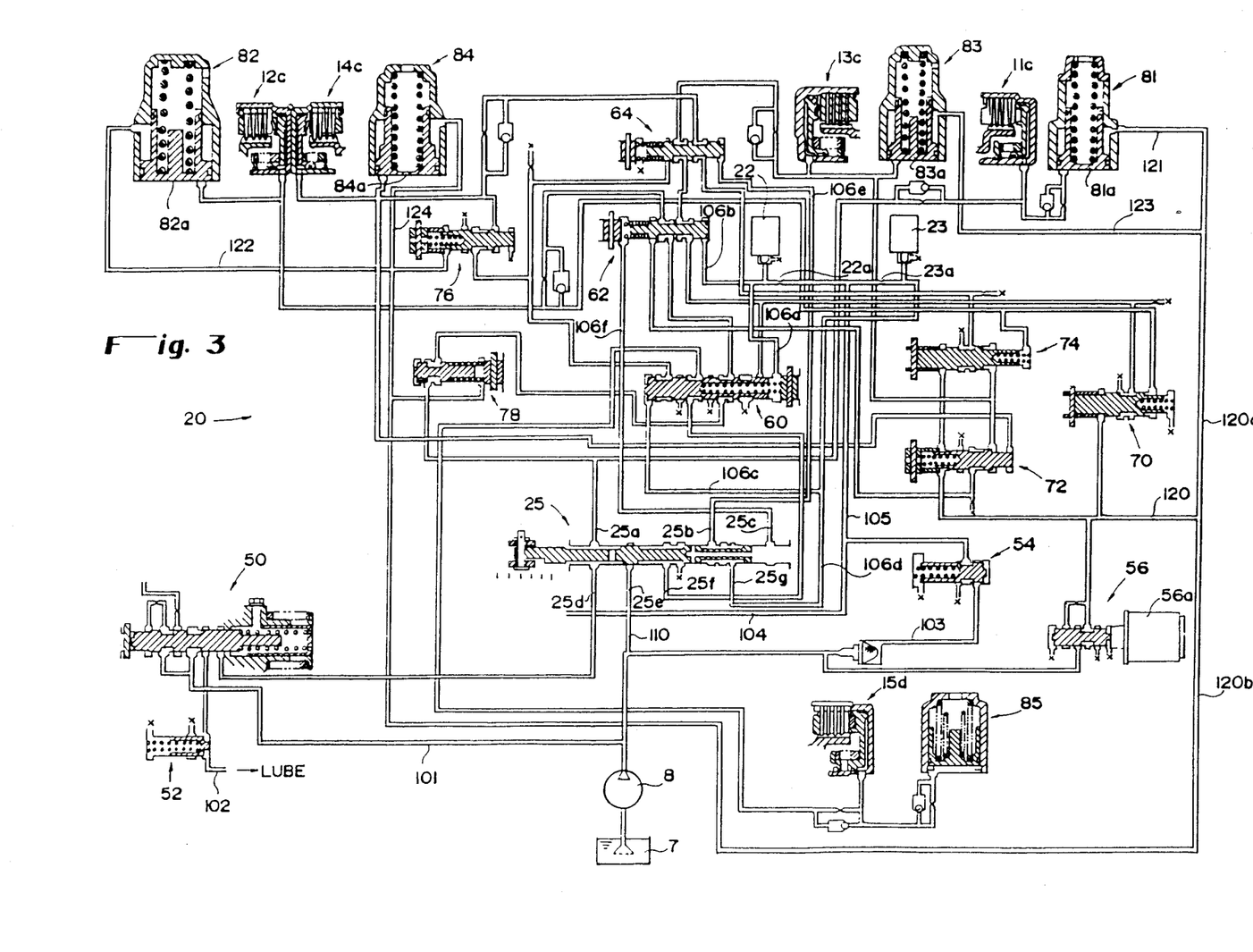
FIG. 3 is a circuit diagram of a hydraulic circuit including a hydraulic control valve assembly for controlling shifts in the automatic transmission.

The hydraulic pressure control valve assembly 20 will be described below with reference to FIG. 3.

The control valve 20 delivers operating oil supplied from an oil sump 7 by a pump 8 to a regulator valve 50 via a line 101, and the pressure of the delivered operating oil is regulated into a predetermined line pressure by the regulator valve 50. The line pressure is applied via a line 110 to the manual spool valve 25 which then selectively supplies the line pressure to the speed range clutches 11c, 12c, 13c, 14c, 15d to control these clutches, dependent on operation of the manual spool valve 25 and various other valves in the control valve assembly 20 according to running conditions of the motor vehicle.

The various valves in the control valve assembly 20 will be described below. The control valve assembly 20 includes a check valve 52 disposed downstream of the regulator valve 50 for preventing the oil used as lubricating oil supplied to various parts of the automatic transmission AT via a line 102 from rising beyond a predetermined pressure level. A modulator valve 54 reduces the line pressure fed from a line 103 to produce a prescribed modulator pressure. The modulator valve 54 then supplies working oil under the modulator pressure via a line 104 to a lockup clutch control circuit (not shown) of the torque converter 2 and also via a line 105 to the first and second solenoid valves 22, 23 for controlling operation of shift valves.

The manual spool valve 25 is operated in interlinked relation to the shift lever 45 that is manually moved by the driver. The manual valve 25 is selectively positioned in any one of six positions P, R, N, D, S, 2 for selectively supplying the line pressure from the line 110 to lines 25a through 25g.

When the manual valve 25 is in any one of the positions D, S, 2, a 1-2 shift valve 60, a 2-3 shift valve 62, and a 3-4 shift valve 64 are controlled by the modulator pressure supplied via lines 106a through 106f dependent on whether the first and second solenoid valve 22, 23 are turned on or off, for controlling the supply of the line pressure to and the discharge of the line pressure from the clutches 11c, 12c, 13c, 14c, for the first through fourth speed ranges, respectively.

The lines 106a, 106b are connected to the first solenoid valve 22 and also to the line 105 through an orifice 22a. When the solenoid of the first solenoid valve 22 is de-energized, its port leading to a drain is closed, and working oil under the modulator pressure is supplied from the line 105 to the lines 106a, 106b. When the solenoid of the first solenoid valve 22 is energized, the drain port thereof is opened to reduce the pressure in the lines 106a, 106b substantially to zero. The lines 106c through 106f are connected to the second solenoid valve 23 and also to the line 105 via an orifice 23a. When the solenoid of the second solenoid valve 23 is turned off, the drain port thereof is closed to allow the working oil under the modulator pressure to be supplied from the line 105 to the lines 106c through 106f. When the solenoid of the second solenoid valve 23 is turned on, the drain port thereof is opened to reduce the pressure in the lines 106c through 106f substantially to zero.

The line 106a is connected to the righthand end (as shown) of the 1-2 shift valve 60, the line 106b is connected to the righthand end of the 2-3 shift valve 62, the line 106c is connected to the lefthand end of the 1-2 shift valve 60, the line 106e is connected to the righthand end of the 3-4 shift valve 64, and the line 106f is connected to the lefthand end of the 2-3 shift valve 62. The lines 106e, 106f are coupled to the second solenoid valve 23 through the manual valve 25 and the line 106d. Therefore, by controlling the operation of the first and second solenoid valves 22, 23 to control the supply of the modulator pressure from the line 105 to the lines 106a through 106f, the operation of the 1-2, 2-3, and 3-4 shift valves 60, 62, 64 can be controlled to selectively supply the line pressure fed from the line 110 via the manual valve 25 to the hydraulically operated clutches 11c, 12c, 13c, 14c for selecting a desired speed range.

The control valve assembly 20 also has first, second, third, and fourth orifice control valves 70, 72, 74, 76 for releasing hydraulic pressure from the hydraulic pressure chamber in the clutch associated with a previous speed range in timed relation to the development of a pressure buildup in the hydraulic pressure chamber in the clutch associated with a next speed range, when a shift is effected. More specifically, the first orifice control valve 70 controls the timing of releasing the hydraulic pressure from the third-speed-range clutch when a downshift is effected from the third speed range to the second speed range. The second orifice control valve 72 controls the timing of releasing the hydraulic pressure from the second-speed-range clutch when an upshift is carried out from the second speed range to the third speed range or from the second speed range to the fourth speed range. The third orifice control valve 74 controls the timing of releasing the hydraulic pressure from the fourth-speed-range clutch upon a downshift from the fourth speed range to the third speed range or from the fourth speed range to the second speed range.

The fourth orifice control valve 76 controls the timing of releasing the hydraulic pressure from the third-speed-range clutch at the time of an upshift from the third speed range to the fourth speed range.

The control valve assesbly 20 further includes accumulators 81, 82, 83, 84 having pressure bearing chambers communicating respectively with the hydraulic pressure chambers of the hydraulically operated clutches 11c, 12c, 13c, 14c. The accumulators 81, 82, 83, 84 also having back pressure chambers opposite to the respective pressure bearing chambers with pistons 81a, 82a, 83a, 84a therebetween, the back pressure chambers being connected to respective lines 121, 122, 123, 124 which are coupled to the linear solenoid valve 56 via lines 120a, 120a and a line 120.

The linear solenoid valve 56 has a linear solenoid 56a. A current supplied to the linear solenoid 56a is controlled to control the operating force of the linear solenoid valve 56 for controlling the magnitude of a hydraulic pressure to be supplied to a line 120. By controlling the current supplied to the linear solenoid 56a, therefore, the hydraulic pressure in the back pressure chambers of the accumulators 81 through 84 can be controlled to control the hydraulic pressure in the hydraulic pressure chamber in an engaged clutch (next-speed-range clutch) when a shift is effected.

In the hydraulic pressure control valve assembly 20 thus constructed, the manual valve 25 is operated by the shift lever 45 and the solenoid valves 22, 23 are turned on and off to selectively supply the line pressure to the hydraulically operated clutches 11c, 12c, 13c, 14c, for automatically selecting a speed range.

Figure 4:
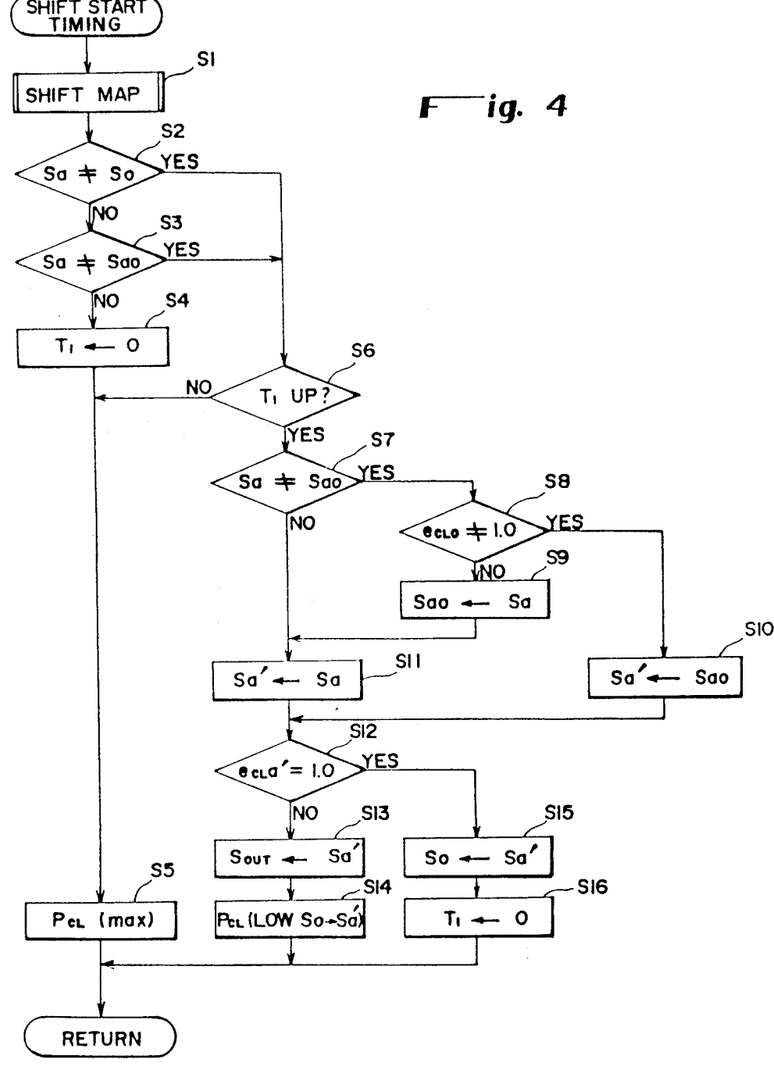
FIG. 4 is a flowchart showing a control sequence of the shift control method of the invention.

Shift control in the transmission thus constructed, particularly a process of controlling the start of a shift, will be described below with reference to the flowchart of FIG. 4.

For shift control, a step S1 checks whether the running condition of the motor vehicle crosses the downshifting or unshifting line in the shift map as shown in FIG. 2. If the running condition crosses the line, then a first shift command is issued for a target speed range Sa to be shifted from a present speed range So.

A step S2 then determines whether such a first shift command is issued or not (Sa≠So). When the motor vehicle is running with the transmission in a certain speed range (after a shift has been made and before a next shift command is issued), no target speed range is set with the target speed range Sa=So, and hence control proceeds from the step S2 to a step S3.

The step S3 determines whether a second shift command is issued or not after the first shift command had been issued and before a shift according to the first shift command is completed. the decision step S3 is carried out by checking whether there is an initial target speed range Sao based on the previous gear command (the first shift command in this case) with respect to a final target speed range Sa based on the latest shift command the second shift command in this case) (Sa≠Sao).

If the first or second shift command is issued, then control goes to a step S6. If no shift command is issued, a decision timer T1 is set to zero in a step S4, and the accumulator back pressure is kept at a maximum level in a step S5, after which the control sequence goes to the return step.

The step S6 determines whether the period of time T1 present by the decision timer has elapsed or not. After elapse of the time T1, control goes to a step S7 which determines whether there is a second shift command or not by checking if Sa≠Sao.

If Sa=Sao, i.e., if no second shift command is issued, control proceeds to a step S11 in which the target speed range Sa based on the first shift command is set as a target speed range Sa' to which the transmission is to be shifted.

If Sa≠Sao, i.e., if there is a second shift command issued, control goes to a step S8 to determine whether the input and output rotational speed ratio $e_{CLO}$ of the present-speed-range clutch (the clutch engaged prior to the issuance of the shift command) is 1.0 or not to find whether the first target-speed-range clutch has started being engaged or not. Since the input portions of all the clutches are mechanically connected through the gears and the output portions thereof are also mechanically connected through the gears as shown in FIG. 1, the starting of engagement of the first target-speed-range clutch is detected by detecting whether the input and output rotational speed ratio $e_{CLO}$ of the present-speed-range clutch which is 1.0 at present varies or not.

More specifically, when the first target-speed-range clutch starts being engaged, the input and output rotational speed ratio $e_{CLO}$ starts to vary. Because the input and output shafts of the present-speed-range clutch are mechanically connected to the first target-speed-range clutch through the gears, as described above, whether the input and output rotational speed ratio $e_{CLa}$ of the target-speed-range clutch is varied or not can be determined by detecting whether the input and output rotational speed ratio $e_{CLO}$ of the present-speed-range clutch is varied or not. Rather than detecting whether the input and output rotational speed ratio $e_{CLO}$ of the present-speed-range clutch is varied or not, whether the input and output rotational speed ratio $e_{CLa}$ of the target-speed-range clutch is varied or not may directly be detected.

While the step S8 determines whether $e_{CLO}=1$ or not, it may determine whether the rotational speed ratio $e_{CLO}$ is smaller than a threshold (of a value slightly smaller than 1.0, for example) which has been present in view of detection errors of the first and second rotational speed sensors 35, 32).

If $e_{CLO}=1.0$, i.e., if the first target-speed-range clutch has not started being engaged, control goes to a step S9 in which the latest, i.e., the second target speed range Sa is set as the initial target speed range Sao, and then the latest target speed range Sa is set as the target speed range Sa' to which the transmission is to be shifted.

As described above, if the second shift command is issued during the preset timer time T1, or before the first target-speed-range clutch starts to be engaged even after elapse of the present time T1, the second shift command is set as the target speed range Sa' to which the transmission is to be shifted.

If the first target-speed-range clutch has started to be engaged when the second shift command is issued, since $e_{CLo}\neq 1.0$, control goes to a step S10 in which the initial target speed range Sao based on the first shift command is set as the target speed range Sa' to which the transmission is to be shifted.

After the target speed range Sa' has thus been set, a step S12 then determines whether the input and output rotational speed ratio $e_{CLa}'$ of the clutch associated with the target speed range to which the transmission is to be shifted is 1.0 or not. If $e_{CLa}'\neq 1.0$, i.e., if this cluch is not yet completely engaged, then a shift output for the target speed range Sa' is issued in a step S13, and the back pressure of the accumulator associated with this clutch is set to a predetermined low pressure $P_{CL}(LOW)$ in a step S14. If $e_{CLa}'=1.0$, i.e., if this clutch is completely engaged, then the target speed range Sa' is set as the present speed range So in a step S15, and the decision timer T1 is set to zero in a step S16.

Figure 5A:
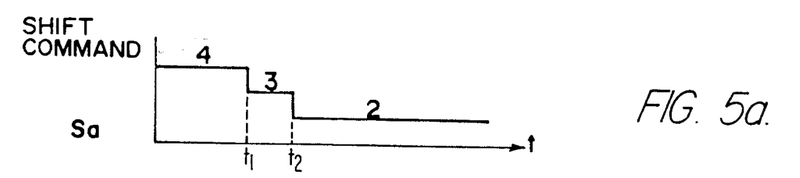
Figure 5B:
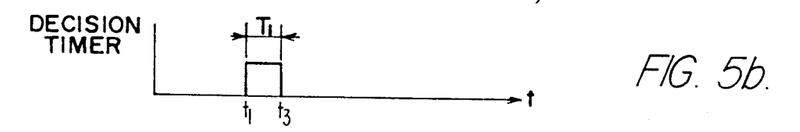
Figure 5C:
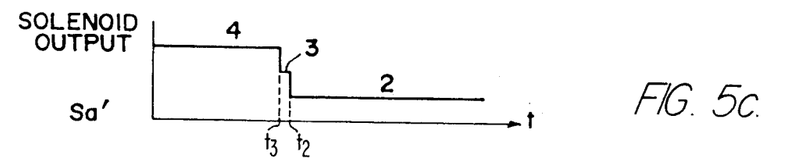
Figure 5D:
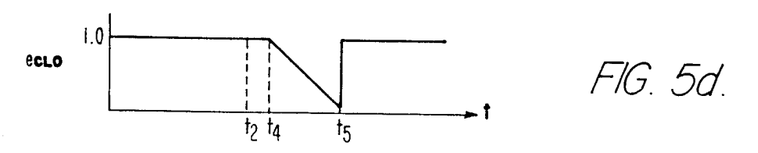
Figure 5E:
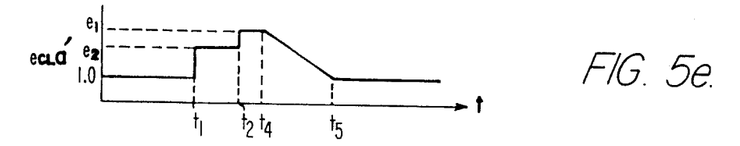
Figure 5F:
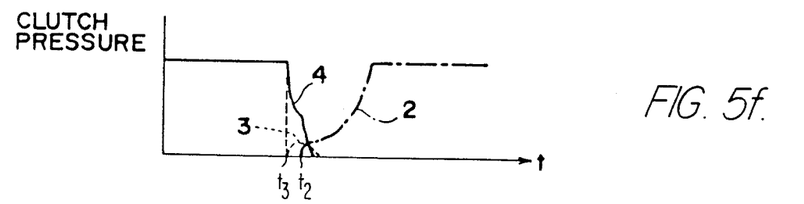

A first example of the above shift control process will be described with reference to the graph of FIG. 5 in which a first shift command is issued for the third speed range while the motor vehicle is running with the transmission in the fourth speed range, and then a second shift command is issued for the second speed range.

While the motor vehicle is running in the fourth speed range, the running condition of the motor vehicle goes across the downshifting line on the shift map from the fourth speed range to the third speed range, and a downshifting command (the first shift command) for the third speed range is issued at a time $t_1$. At this time, the fourth speed range is the present speed range So, the third speed range is the latest target speed range Sa and the initial target speed range Sao to which the transmission is to be shifted in Sa since no second shift command is issued as yet. At the same time, the decision timer is turned on, and any shift is inhibited (the step S6 in FIG. 4) until the period of time T1 of the decision timer elapses (until a time $t_3$). During this time interval, therefore, the shift solenoid output based on the target speed range Sa' remains to be set for the fourth speed range. The shift solenoid output is then set for the third speed range at the time $t_3$ when the time period T1 elapses (the steps S7 through S11).

Since the shift solenoid output remains unchanged up to the time $t_3$, the input and output rotational speed ratio $e_{CLO}$ of the present-speed-range clutch is 1.0. Even when the shift solenoid output is changed for the third speed range at the time $t_3$, the third-speed-range clutch (i.e., the first target-speed-range clutch) does not immediately start to be engaged, so that the rotational speed ratio $e_{CLO}$ remains to be 1.0 for a while. Since the target speed range is the third speed range at the time $t_3$, the input and output rotational speed ratio $e_1$ of the third-speed-range clutch is read as the input and output rotational speed ratio $e_{CLa}'$ of the target-speed-range clutch.

At this time, the clutch pressure in the fourth-speed-range clutch is quickly lowered as the shift solenoid output is changed at the time $t_3$, and the clutch pressure in the third-speed-range clutch is increased. Since the hydraulic pressure in the pressure chamber of the fourth-speed-range clutch is not sharply dropply and the accumulator back pressure is set to a lower level (the step 14), the initial clutch pressure of the third-speed-range clutch is low. Because of the low initial clutch pressure and the ineffective stroke of the clutch piston, the third-speed-range does not immediately start to be engaged.

Then, the second shift command for the second speed range is issued at a time $t_2$ (slightly after the time $t_3$). Now, the second speed range becomes the latest target speed range Sa, and the third speed range becomes the initial target speed range Sao. Inasmuch as the third-speed-range clutch (the first target-speed-range clutch) does not begin to be engaged at the time $t_2$, the second shift command is accepted at this time, and the shift solenoid output is switched from the third speed range to the second speed range (the steps S8 to S9 to S11). The clutch pressure of the second-speed-range clutch is supplied and increased, and the clutch pressure of the third-speed-range clutch which has been increased from the time $t_3$ is lowered. After a certain time delay, the second-speed-range clutch starts to be engaged at a time $t_4$ to make a shift from the fourth speed range to the second range (the steps S12 and S13 to S14).

The input and output rotational speed ration $e_{CLO}$ of the present-speed-range clutch is gradually lowered from the time $t_4$ at which the fourth-speed-range clutch starts to be disengaged or the second-speed-range clutch starts to be engaged. At a time $t_5$ when the second-speed-range clutch is completely engaged and the shift is finished, the second-speed range clutch becomes the present-speed-range clutch, and the input and output rotational speed ratio of 1.0 is set in this clutch (the steps S12 to S15). Since the target speed range is switched from the third speed range to the second speed range at the time $t_2$, the input and output rotational speed ratio $e_{Cla}'$ of the target-speed-range clutch is set to the input and output rotational speed ratio $e_2$ of the second-speed-range clutch at the time $t_2$. The rotational speed ratio is gradually reduced as the second-speed-range clutch is progressively engaged from the time $t_4$, and becomes 1.0 at the time $t_5$ when the clutch is fully engaged.

According to the aforesaid shift control, the period of time after the first shift command had been issued until the second shift command is accepted is the same as the period of time until the present-speed-range clutch (the fourth-speed-range clutch in the above example) starts being disengaged or the first target-speed-range clutch (the third-speed-range clutch in the above example) starts being engaged. After elapse of the present time T1 of the decision timer, since there is a certain time lag T2 after a hydraulic pressure is supplied to the third-speed-range clutch by the operation of the shift solenoid until the third-speed-range clutch starts being engaged, the period of time in which the second shift command can be accepted is longer than the preset time T1 of the decision timer by the time lag T2. Therefore, even if the period of time in which the second shift command is acceptable is set to a period of time T3. (equal to the period of time to which the decision timer is set according to the conventional shift control process) required for preventing the transmission from effecting shifts too busily, the preset time T1 of the decision timer is shorter than the required time T3 by the time lag T2. Accordingly, the preset time T1 of the decision timer in the control process of the present invention is shorter than the present period of time which has been required in the conventional shift control.

Consequently, when only one shift command is issued or the second shift command is issued in the present time T1 of the decision timer, the shift is started at the same time that the preset time T1 shorter than the conventional preset time elapses. Thus, a time lag in making the shift is shortened and the shift can be effected without giving the driver an odd feeling.

If the second shift command is issued in the preset time of the decision timer (until the time $t_3$), the shift based on the second shift command, i.e., the shift from the fourth speed range to the second speed range is carried out upon elapse of the preset time of the decision timer (at the time $t_3$).

Figure 6A:
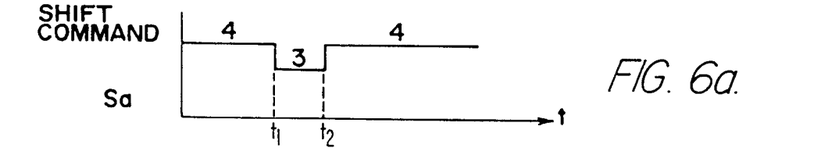
Figure 6B:
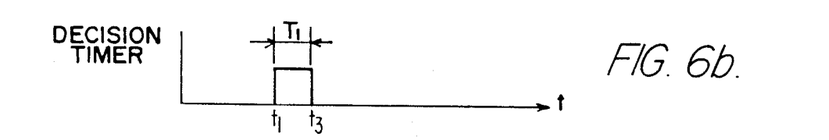
Figure 6C:
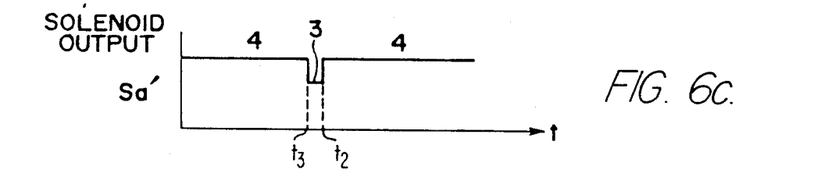
Figure 6D:
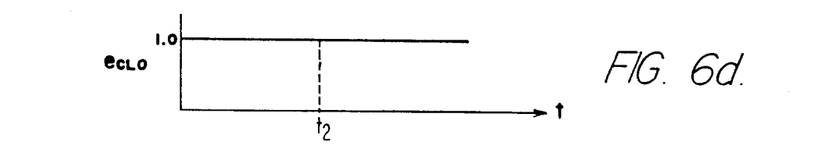
Figure 6E:
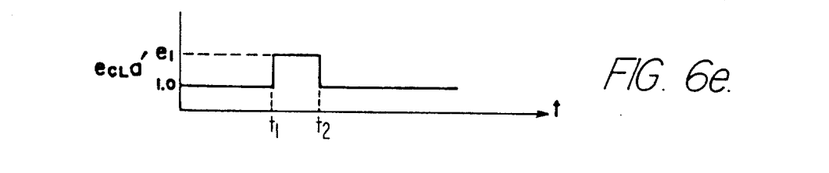
Figure 6F:
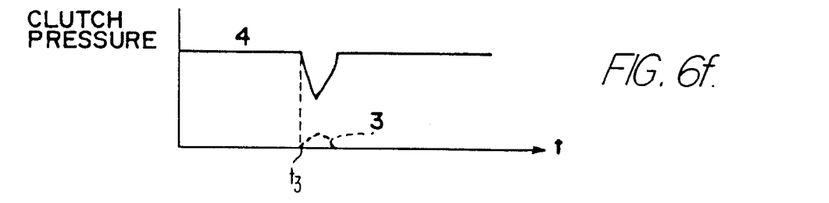

A second example of the shift control process will be described with reference to the graph of FIG. 6 in which a first shift command is issued for the third speed range while the motor vehicle is running with the transmission in the fourth speed range, and then a second shift command is issued for the fourth speed range.

The control process of FIG. 6 is substantially the same as the control process of FIG. 5. Even if the shift command for the third speed range is issued at a time $t_1$, it is permitted only upon elapse of the preset time of the decision timer T1 (the step S6). Therefore, a shift solenoid output based on the target speed range Sa' to which the transmission is to be shifted becomes an output for the third speed range at a time $t_3$ after elapse of the timer time T1 (the steps S7 to S11).

Therefore, from the time $t_3$, the clutch pressure in the fourth-speed range clutch is rapidly lowered and the clutch pressure in the third-speed-range clutch is increased. As described above, disengagement of the fourth-speed-range clutch and engagement of the third-speed-range clutch are not immediately started, and hence the input and output rotational speed ratio $e_{CLa}'$ of the target-speed-range clutch (the third-speed-range clutch) is not varied right away. When the second shift command for the fourth speed range is issued at a time $t_2$ (now the fourth speed range becomes the latest target speed range Sa and the third speed range becomes the initial target speed range Sao), since disengagement of the fourth-speed-range clutch and engagement of the third-speed-range clutch are not yet started, the shift solenoid output is switched to an output for the fourth speed range (the steps S7 to S8 to S9 to S11). Inasmuch as the latest target speed range Sa is set as the initial target speed range Sao as indicated in the step S9, the condition Sa=Sao=So is attained subsequently, and control proceeds to the step S5 in which the accumulator back pressure is maximized.

Figure 7A:
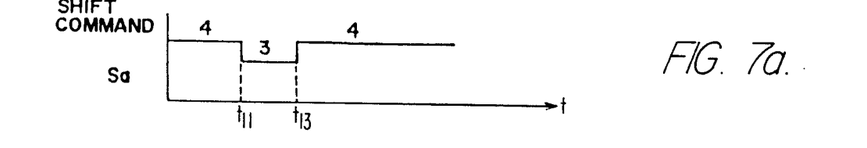
Figure 7B:
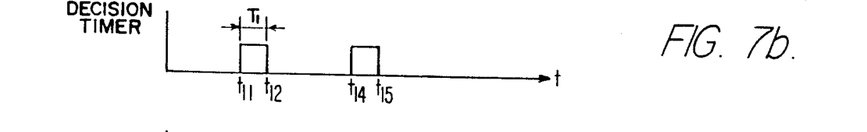
Figure 7C:
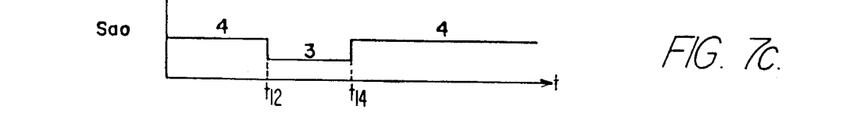
Figure 7D:
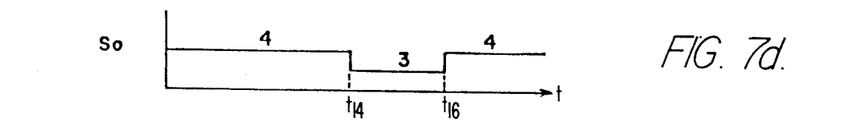
Figure 7E:
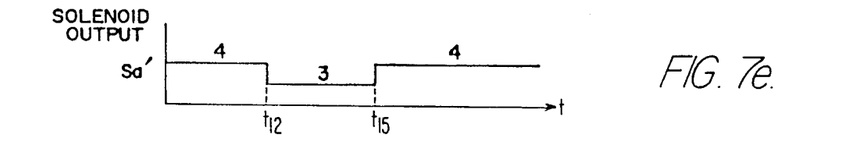
Figure 7F:
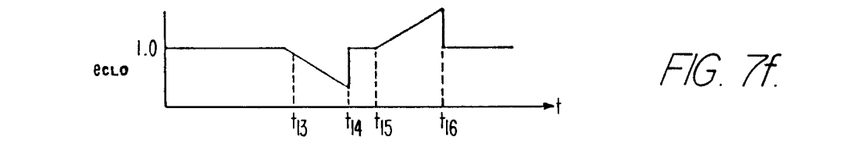
Figure 7G:
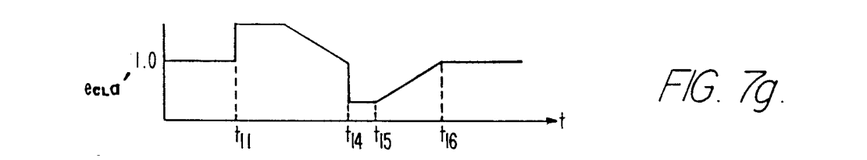
Figure 7H:
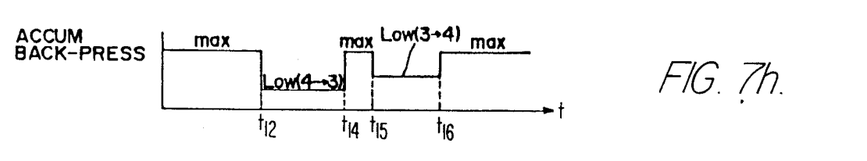
Figure 7I:
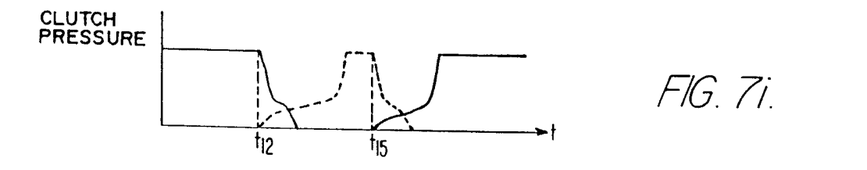

In the above examples, the second shift command is issued before the target-speed-range clutch starts to be engaged. A control process in which a second shift command is issued after a target-speed-range clutch has started to be engaged will hereinafter be described with reference to FIG. 7.

While the motor vehicle is running with the transmission in the fourth speed range, a first shift command is issued for the third speed range at a time $t_{11}$, and then a second shift command is issued for the fourth speed range at a time $t_{13}$. At the same time that the first shift command is issued, the decision timer is operated, and then the shift solenoid output based on the target speed range Sa' to which the transmission is to be shifted is switched to an output for the third speed range at a time $t_{12}$ when the preset time of the decision timer elapses. The clutch pressure in the fourth-speed-range clutch is released and rapidly reduced, and the clutch pressure in the third-speed-range clutch is increased to a level corresponding to the accumlator pressure which has been set to a low level. After a certain time delay, the third-speed-range clutch starts to be engaged, and the input and output rotational speed ratio $e_{CLa}'$ of the third-speed-range clutch starts to be engaged, and the input and output rotational speed ratio $e_{CLa}'$ of the third-speed-range clutch (the target-speed-range clutch) starts being lowered, and so does the input and output rotational speed ratio $e_{CLO}$ of the fourth-speed-range clutch (the present-speed-range clutch) from 1.0.

In this example, the second shift command for the fourth speed range is issued at the time $t_{13}$. At the time $t_{13}$, the fourth-speed-range clutch has already started to be disengaged and the third-speed-range clutch has already started to be engaged, and the input and output rotational speed ratio $e_{CLa}'$ of the third-speed-range clutch has started to vary. At this time, the present speed range So is the fourth speed range, and the latest target speed range Sa is also the fourth speed range (So=Sa). If the shift solenoid output were immediately switched to the output for the fourth speed range, however, since the fourth-speed-range clutch has started to produce a certain amount of slippage, both the third- and fourth-speed-range clutches would be highly likely to be disengaged or in the neutral position. Therefore, the danger of engine racing would be high when a next shift is made.

To avoid the above problem, the steps S2 to S3 to S6 to S7 to S8 to S10 to S12 to S13 to S14 are followed, and the shift command (the first shift command) is maintained until the clutch of the target speed range Sa' (the third speed range in this example) to which the transmission is to be shifted is completely engaged.

When the third-speed-range clutch is completely engaged and its input and output rotational speed ratio $e_{CLa}'$ becomes 1.0 at a time $t_{14}$, the target speed range Sa' up to now is set as the present speed range So (the step S15). At the same time, the decision timer T1 is reset to zero (the step S16). Accordingly, after elapse of the preset time T1 of the decision timer from the time $t_{14}$, a shift from the third speed range to the fourth speed range is effected based on the second shift command (the steps S2 to S6 to S7 to S11 to S12).

According to this control process in which gear-shifts are to be made from the fourth speed range to the third speed range back to the fourth speed range, if the third-speed-range clutch has started to be engaged when the second shift command is issued to shift from the speed range to the fourth speed range, the gear-shift back into the fourth speed range is effected based on the second shift command after the shift into the third speed range based on the first shift command has been completed, thereby preventing a shift shock.

While downshifts have been described in the above embodiment, upshifts can also be controlled according to a similar shift control process.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of controlling shifts in an automatic transmission having power transmission means comprising a plurality of power transmission paths, and a plurality of shift means for selecting the power transmission paths, said shift means being selectively operable in response to a shift command for switching said power transmission paths to effect shifts, said method comprising the steps of:

when a first shift command is issued for effecting one of the shifts, detecting the start of operation of the first shift means which selects the first power transmission path determined by said first shift command; and when a second shift command is issued to select the second power transmission path different from the first power transmission path, after said first shift command is issued but before the start of operation of the first shift means is detected, effecting the shift based on said second shift command.

2. A method according to claim 1, wherein the start of operation of the first shift means is detected by detecting a change in the input and output rotational speed ratio $e_{CLO}$ of the shift means which has been operated before said first shift command is issued.

3. A method according to claim 1 or 2, wherein when said second shift command is issued after said first shift command has been issued and also after the start of operation of said first shift means has been detected, the shift based on said second shift command is effected after the shift based on said first shift command had been completed.

4. A method of controlling shifts in an automatic transmission having power transmission means including a plurality of power transmission paths and a plurality of shift means for selecting the power transmission paths, the shift means being selectively operable in response to a shift command for switching the power transmission paths to effect shifts, comprising the steps of:

detecting a first shift command to select a first power transmission path and immediately starting a short time delay for effecting a shift in response to the first shift command;

detecting a second shift command to select a second power transmission path;

detecting a start of operation of a first shift means to shift to the first power transmission path corresponding to the first shift command;

effecting a shift to said second power transmission path corresponding to said second shift command if said start of operation of the first shift means has not been detected when the second shift command is detected even though said short time delay has expired or completing a shift to said first power transmission path corresponding to said first shift command if said start of operation of the first shift means has been detected when the second shift command is detected.

5. A method according to claim 4, wherein the start of operation of the first shift means is detected by detecting a change in the input and output rotational speed ratio $e_{CLO}$ of a shift means which has been operated before said first shift command is issued.

6. A method according to claim 4 or 5, wherein said second shift command is issued after said first shift command had been issued and also after the start of operation of said first shift means has been detected, the shift based on said second shift command is effected after the shift based on said first shift command has been completed.

* * * * *